March 19, 1963 H. K. DONNELL 3,081,526
METHOD OF MAKING ELECTRODE SPACING MEANS
Filed Feb. 23, 1960 2 Sheets-Sheet 1

INVENTOR.
HOWARD K. DONNELL
BY
L. A. Larsen
ATTORNEY

March 19, 1963  H. K. DONNELL  3,081,526
METHOD OF MAKING ELECTRODE SPACING MEANS
Filed Feb. 23, 1960  2 Sheets-Sheet 2

INVENTOR.
HOWARD K. DONNELL
BY L. A. Larsen
ATTORNEY

United States Patent Office 3,081,526
Patented Mar. 19, 1963

3,081,526
METHOD OF MAKING ELECTRODE SPACING MEANS
Howard Kenneth Donnell, Lancaster, Pa., assignor to Radio Corporation of America, a corporation of Delaware
Filed Feb. 23, 1960, Ser. No. 10,115
3 Claims. (Cl. 29—155.5)

This invention relates to improved alignment and brazing jigs. In particular, this invention relates to an improved method of and means for obtaining accurate interelectrode spacing between closely spaced electrodes of a vacuum tube.

In vacuum tubes utilizing cylindrical electrodes, the electrode elements are often in the shape of a cup which is supported by a flanged end. These electrodes are maintained in predetermined positions by means of ceramic insulators, which form a part of the envelope wall, and are sealed between the flanges on the cup shaped electrodes. When this type of a vacuum tube is used at ultra high frequencies, it is desirable that the electrodes be relatively small and the electrode spacing be extremely close and accurate. With the requirement of close concentric relationship between the electrodes, it has been found that the known alignment jigs and fixtures do not control the inter-element spacing as accurately as desired when reasonable manufacturing tolerances are used.

It is therefore an object of this invention to provide a novel method of and means for obtaining accurate interelectrode spacing in a vacuum tube.

It is another object of this invention to provide an improved alignment jig characterized in its high accuracy and low cost.

These and other objects are accomplished in accordance with this invention by providing a shimming means that is positioned between two concentric cup shaped electrodes during the assembling process of the tube. Due to the presence of the shimming means, accurate alignment between the electrodes is obtained when using standard manufacturing tolerances and with a minimum of cost. When the sub-assembly is completed, the shimming means is removed.

The invention will be more clearly understood by reference to the accompanying two sheets of drawings wherein.

Figure 1:
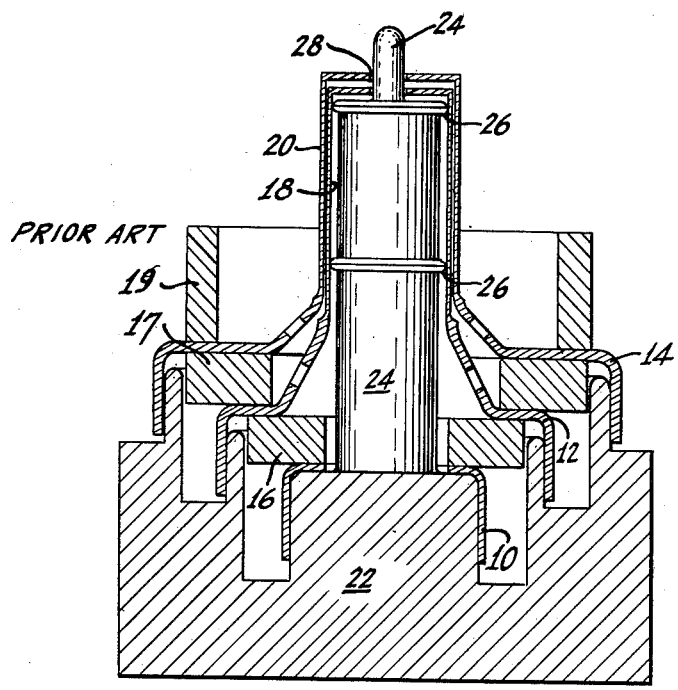
FIG. 1 is an enlarged sectional view of a prior art jig and sub-assembly.

Referring specifically now to FIG. 1 there is shown an enlarged sectional view of a prior art method of assembling a sub-assembly of a tube of the type including a metal-to-ceramic envelope having coaxially arranged electrodes. The tube elements shown are a cathode contact ring 10, a control grid ring 12 and a screen grid ring 14. Spaced between each of the various rings, or flanges, is a different one of a plurality of annular shaped ceramic insulators 16, 17 and 19. Extending respectively from the control grid ring 12 and the screen grid ring 14 is a generally cup shaped control grid 18 and screen grid 20. The insulators 16 are sealed to the rings 10, 12 and 14 by a solder (not shown).

During the prior art method of manufacturing, the sub-assembly referred to, a stainless steel alignment-brazing jig 22 was used by means of which it was attempted to align, and maintain the concentric spacing between, the control grid 18 and the screen grid 20 from a central jig post 24. During the tube processing of a tube of this type having approximately a one inch length and a ¾ inch diameter, the control grid 18, having a tolerance of ±0.0005 inch, was placed over the ribbed central post 24. In order to allow for a proper fit, i.e. a clearance of .0005 inch and the maximum tolerance of the inside diameter of the control grid 18, the ribs 26 on the control post 24 were machined as close to this as practicable resulting in a tolerance of minus zero to plus about 0.0005 inch. Thus, even with the accurate machining, the control grid 18 could be eccentric, with respect to the jigging ribs 26, by as much as 0.0015 inch.

To suport the screen grid 20, the smaller diameter of the jigging post 24 at the top thereof as viewed in FIG. 1, was machined to fit as closely as possible, i.e. to a tolerance of minus zero to plus about 0.0005 inch, into the screen grid jigging hole 28. With the screen grid jigging hole 28 machined as closely as possible, i.e. to a tolerance of approximately ±0.0005 inch, and with the desired fit, e.g. a clearance of .0005 inch, it was possible that the jigging hole 28 could be eccentric, with respect to the jigging central post 24, by as much as 0.0015 inch.

Thus, when practicing the prior art method of assembly, the jigging ribs and the jigging post could be eccentric with respect to one another by the maximum allowable amount (0.001 inch), and it was possible for the control grid 18 to be eccentric with respect to the screen grid 20 by a maximum of 0.004 inch. With these maximum eccentrics, the result would be that the screen grid actually touched the control grid at one point.

The above description illustrates the problems involved in the use of the prior art system. Briefly, in this system, the cost of making parts and jigs to close enough tolerances, i.e. those which would satisfy the requirements of concentricity, would be prohibitive for the manufacture of a low cost mass production item.

Figure 2:
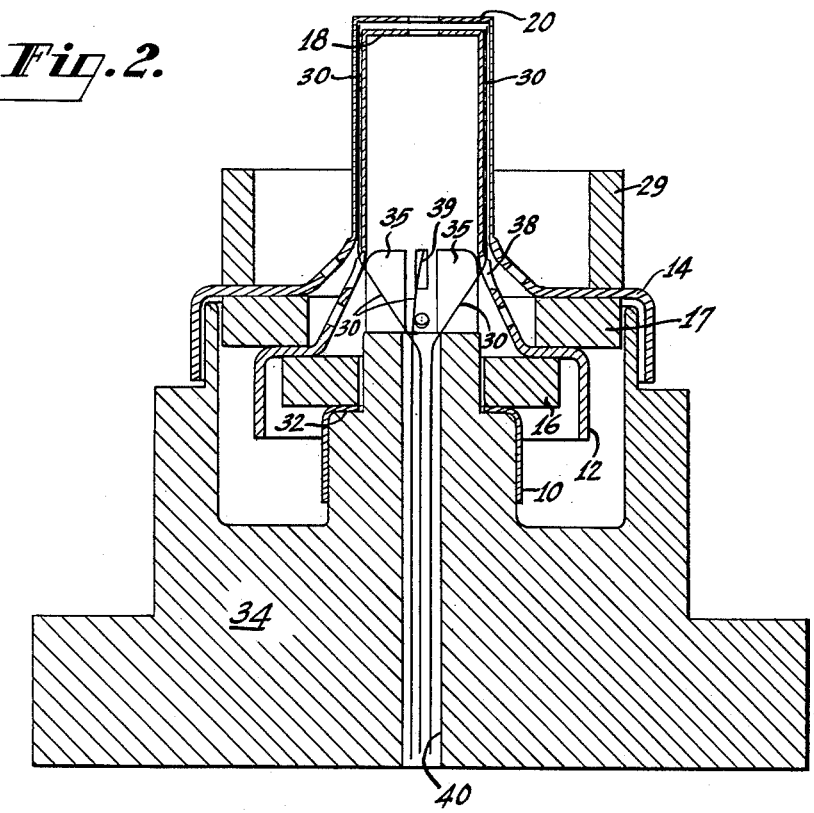
FIG. 2 is an enlarged sectional view of a jig and tube sub-assembly in accordance with this invention.

Thus, applicant's invention, as shown in FIG. 2, provides a novel method of and means for accurately aligning closely spaced cylindrical or cup shaped electrode cylinders with a minimum of manufacturing cost. As shown in FIG. 2, the spacing between the control grid cylinder 18 and the screen grid cylinder 20 is maintained by the presence of a plurality of shims 30 of the proper thickness that are positioned therebetween. The cathode contact ring 10 is maintained in position by being mounted on a plane of a shoulder 32 of the improved alignment and brazing jig 34. The insulating ceramic 16 is then seated on the shoulder on the cathode contact ring 10 and the control grid ring 12 positioned thereon. The control grid ring 12 is axially positioned, with respect to the cathode ring 10, by means of the accurately machined outer diameter of the top or shoulder 35 on the center post of the jig 34. The spacing between the control grid cylinder 18 and the cathode is determined by the thickness of the ceramic 16 and the sealing materials. After the control grid is positioned, a plurality of spacing shims 30 are positioned between the screen grid 14 and the control grid 12, resulting in accurate positioning of these members with respect to each other and with respect to the cathode ring 10.

The spacing shims 30 extend through slots or apertures 38 in the control grid cylinder 18 and into a center hole 40, through slots or apertures 39, in the brazing jig 34. Thus, all of the jigging necessary to provide concentricity between the control grid cylinder 18 and the screen grid cylinder 20 is done directly by means of the shims 30 eliminating errors in the spacing. The shims 30 are preferably drawn wires of stainless steel of the proper diameter, approximately 0.0002 inch less than the control grid to screen grid spacing. In the particular example given above, the stainless steel wires had a diameter of approximately 0.0035 inch. The stainless steel wires 30 are oxidized in a furnace using a wet hydrogen atmosphere at a temperature of approximately 1,000° C. to prevent the brazing of the wires to the electrode parts during the brazing operation of sealing the ceramics 16, 17 and 19 to the rings 10, 12 and 14 respectively.

To position the shims or wires 30, the individual wires 30, prior to the mounting of the screen grid, are glued longitudinally to the outer surface of the control grid cylinder 18 with a cement which has the property of burning away during a subsequent brazing operation. One such cement that is commercially available is mono butylmethacrylate dissolved in toluene. The ends of the wires are approximately flush with the end of the control grid structure and are spaced approximately 120° apart if three wires are used or 90° apart if four wires are used. It should be understood that the shims 30 can be temporarily fixed to the control grid cylinder 18 either before or after the control grid cylinder 18 is positioned on the upper shoulder 35 of the central jig post.

Once the tube elements have been assembled on the jig, the assembly, including a brazing material between each of the ceramic insulators 16 and each electrode flange, is brazed in a hydrogen atmosphere furnace to secure the tube parts. During this brazing operation, the positioning cement burns away so that the wires can be removed from the jig by carefully pulling them out through the control grid slots 38, the center post slots 39 and the center jig hole 40. Thus, by proper selection of the diameter of the stainless steel wires 30, very close tolerances can be achieved with a minimum of cost since accurately drawn wire is relatively inexpensive.

Figure 3:
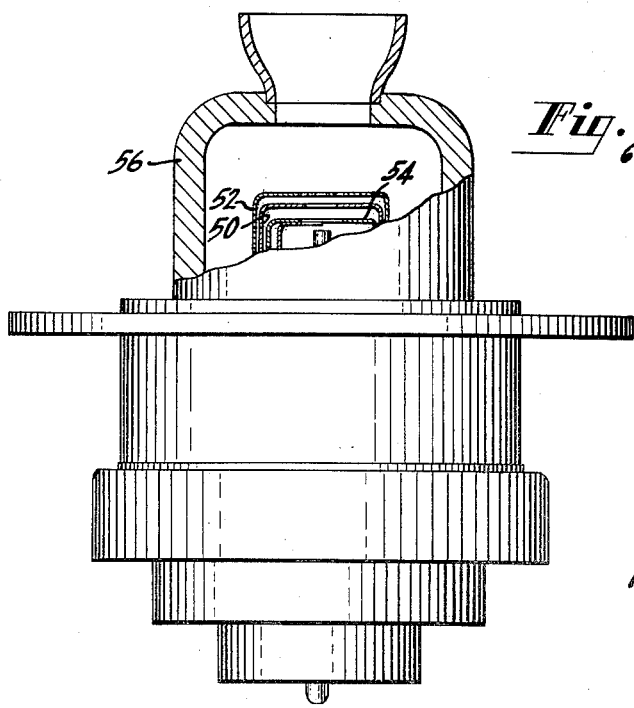
FIG. 3 is a partially sectional view of a vacuum tube made in accordance with this invention.

Referring to FIG. 3, there is shown a partially sectional view of a completed tube structure made in accordance with this invention. Once the jigging operation has been done, as described in connection with FIG. 2, the control grid cylinder and the screen grid cylinder are cut through to form control grid wires 50 and screen grid wires 52 by an electric spark machining process to produce approximately 66 wires, each of which is approximately 3 mils in thickness. Every 60° around the axis there is formed a support wire which is approximately 14 mils wide. When the aligned concentric grids have been manufactured, as has been described, the cathode 54 and anode 56 structures are provided to complete the tube structure as shown in FIG. 3, by any known means.

Thus applicant's invention has provided a novel method of and means for obtaining accurate spacing between elongated tubular members with a minimum of cost. It should be understood that the specific example that has been described throughout this specification was given merely to illustrate the invention, and the invention should not be limited to the dimensions, tolerances etc., referred to in this example.

What is claimed is:

1. The method of aligning and positioning substantially cup shaped electrodes having outwardly extending radial flanges, while said electrodes are being brazed at a predetermined temperature to a ceramic ring member, said method comprising positioning the inner electrode on a mandrel post, temporarily affixing a plurality of wire shims to the outer surface of said inner electrode in a manner sensitive to said predetermined temperature for releasing said shims from said outer surface, inserting a ceramic ring member over said inner cup-shaped electrode, seating said ring member on the flange of said inner cup-shaped electrode, positioning and concentrically aligning an outer electrode on said shims and around said inner electrode, seating said flange of said outer electrode on said ceramic ring member, said wire shims positioning and aligning concentrically said cup-shaped electrodes, brazing said flanges to said ceramic ring member therebetween at said predetermined temperature for mutually fixing the same and releasing said wire shims from said inner electrode, and removing said wire shims from between the brazed assembly of concentrically spaced cup-shaped electrodes.

2. The method of manufacturing a sub-assembly, said method comprising positioning a hollow cup shaped control grid cylinder having an outwardly extending radial flange, around a shoulder of a central post, temporarily affixing a plurality of wire shims to the outer surface of said control grid cylinder in such a manner as to be released from said outer surface in response to a predetermined temperature and as to be capable of being withdrawn through said central post, telescoping a ceramic ring member over said control grid cylinder, seating said ceramic ring member on said flange, positioning and concentrically aligning the inner surface of a hollow cup shaped screen grid cylinder having an outwardly extending radial flange around said control grid cylinder by means of said shims, seating said last named flange on said ceramic ring member, brazing said flanges of said grid cylinders to said ceramic ring member at said predetermined temperature thereby loosening the bond between said shims and said control grid cylinder, and removing said shims through said central post.

3. Method of making a sub-assembly comprising two coaxial foraminous tubular members having outwardly extending radial flanges at adjacent ends in mutually fixed relation, the flange on the inner of said members having at least three holes extending therethrough and substantially equally spaced angularly around the axis of said inner member, said method comprising temporarily affixing to the outer surface of the inner of said members while said surface is in non-foraminous form, at least three wire shims equally spaced around said inner member and extending in parallel relation to the axis thereof and through said holes to provide access portions of said shims remote from said inner member, said shims being adapted to be released from said temporarily fixed relation to said inner member in response to a predetermined temperature, inserting an insulating ring member over said inner of said members, seating said ring member on the flange of said inner of said members, telescoping the outer of said members in non-foraminous form over said inner member and into engagement with said shims and seating the flange of said outer member on said insulating ring to dispose said flanges in closely spaced relation, said inner and outer members being positioned and aligned concentrically by means of said shims, brazing said flanges to said ring member at said predetermined temperature for mutually fixing the same, whereby said shims are loosened from said inner member, engaging said access portions of said shims and pulling said shims away from engagement with said inner and outer members, and thereafter cutting registering apertures in the sides of said members.

References Cited in the file of this patent

UNITED STATES PATENTS

| | | |
|---|---|---|
| 2,423,750 | Benson | July 8, 1947 |
| 2,527,150 | Quinlan | Oct. 24, 1950 |
| 2,801,603 | Reichelt | Aug. 6, 1957 |
| 2,935,783 | McCullough et al. | May 10, 1960 |